(12) United States Patent
Jang et al.

(10) Patent No.: US 12,154,051 B2
(45) Date of Patent: Nov. 26, 2024

(54) METHOD OF MAKING WORK PLANS FOR CONSTRUCTION MACHINERY

(71) Applicant: HD HYUNDAI INFRACORE CO., LTD., Incheon (KR)

(72) Inventors: Junhyun Jang, Incheon (KR); Heongsik Um, Incheon (KR); Gijung Yun, Incheon (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 237 days.

(21) Appl. No.: 17/777,671

(22) PCT Filed: Nov. 18, 2020

(86) PCT No.: PCT/KR2020/016257
§ 371 (c)(1),
(2) Date: May 18, 2022

(87) PCT Pub. No.: WO2021/101241
PCT Pub. Date: May 27, 2021

(65) Prior Publication Data
US 2022/0405675 A1 Dec. 22, 2022

(30) Foreign Application Priority Data

Nov. 18, 2019 (KR) .......... 10-2019-0147498
Nov. 17, 2020 (KR) .......... 10-2020-0153568
Nov. 17, 2020 (KR) .......... 10-2020-0153727

(51) Int. Cl.
*G06Q 10/0631* (2023.01)
*E02F 9/20* (2006.01)
(Continued)

(52) U.S. Cl.
CPC ..... *G06Q 10/06316* (2013.01); *E02F 9/2045* (2013.01); *E02F 9/205* (2013.01);
(Continued)

(58) Field of Classification Search
CPC .. G06Q 10/00–50/00; E02F 1/00–9/00; G05D 1/00–2111/00
(Continued)

(56) References Cited

U.S. PATENT DOCUMENTS 4,963,865 A * 10/1990 Ichikawa ............. G09B 29/106
73/178 R
6,223,110 B1 4/2001 Rowe et al.
(Continued)

FOREIGN PATENT DOCUMENTS

JP H11-247231 A 9/1999
JP 2019-91231 A 6/2019
(Continued)

OTHER PUBLICATIONS

International Search Report issued on Feb. 25, 2021, in connection with International Patent Application No. PCT/KR2020/016257, along with an English translation.
(Continued)

*Primary Examiner* — Alan S Miller
(74) *Attorney, Agent, or Firm* — Hauptman Ham, LLP

(57) ABSTRACT

In a method of making work plans for construction machinery, information of the construction machinery at a work site is obtained. The information of the construction machinery is received via a wireless communication. The information of the construction machinery is displayed on a display portion of a server. A work plan of the construction machinery is created on the display portion of the server by using the information of the construction machinery and information stored in the server. The work plan is transmitted to the construction machinery.

18 Claims, 19 Drawing Sheets

(51) Int. Cl.
  *G05D 1/00* (2024.01)
  *G06Q 50/08* (2012.01)
(52) U.S. Cl.
  CPC ......... *G05D 1/0044* (2013.01); *G05D 1/0214* (2013.01); *G05D 1/0219* (2013.01); *G06Q 50/08* (2013.01)
(58) Field of Classification Search
  USPC .............................................. 705/7.11–7.42
  See application file for complete search history.

(56) References Cited

U.S. PATENT DOCUMENTS

| | | | | |
|---|---|---|---|---|
| 10,710,595 | B2* | 7/2020 | Suzuki | G07C 5/085 |
| 2004/0204827 | A1* | 10/2004 | Usui | G01C 21/30 |
| | | | | 340/995.19 |
| 2006/0020430 | A1* | 1/2006 | Gipps | G06Q 10/047 |
| | | | | 703/1 |
| 2007/0193798 | A1* | 8/2007 | Allard | B60T 7/22 |
| | | | | 180/169 |
| 2008/0084324 | A1* | 4/2008 | Wallace | G06Q 10/06 |
| | | | | 340/679 |
| 2009/0198505 | A1* | 8/2009 | Gipps | G06Q 10/047 |
| | | | | 705/1.1 |
| 2010/0171757 | A1* | 7/2010 | Melamed | G06F 16/29 |
| | | | | 382/113 |
| 2015/0081399 | A1* | 3/2015 | Mitchell | G08G 1/20 |
| | | | | 705/7.38 |
| 2015/0161969 | A1* | 6/2015 | Zaizen | G06T 11/60 |
| | | | | 345/629 |
| 2015/0167461 | A1* | 6/2015 | Sugihara | E21C 35/00 |
| | | | | 299/1.05 |
| 2015/0329102 | A1* | 11/2015 | Yoshikawa | B60W 10/06 |
| | | | | 701/1 |
| 2016/0169679 | A1* | 6/2016 | Kajino | G01S 19/42 |
| | | | | 701/491 |
| 2016/0253853 | A1* | 9/2016 | Yamamoto | G06Q 10/06 |
| | | | | 701/50 |
| 2017/0076517 | A1* | 3/2017 | Harter | G06Q 10/063114 |
| 2017/0318732 | A1* | 11/2017 | Yamashita | G05D 1/02 |
| 2018/0164117 | A1* | 6/2018 | Sakaguchi | B60K 35/00 |
| 2018/0210092 | A1* | 7/2018 | Shinkai | G01S 19/04 |
| 2018/0374364 | A1* | 12/2018 | Kennedy | H04W 4/38 |
| 2019/0227561 | A1* | 7/2019 | Hiramatsu | G05D 1/0278 |
| 2021/0272046 | A1* | 9/2021 | Kurinami | G05D 1/225 |
| 2021/0365036 | A1* | 11/2021 | Dix | G05D 1/0238 |
| 2022/0281456 | A1* | 9/2022 | Giovanardi | G01S 17/931 |

FOREIGN PATENT DOCUMENTS

| | | |
|---|---|---|
| KR | 10-2011-0110648 A | 10/2011 |
| KR | 10-2016-0118706 A | 10/2016 |
| WO | 2017/130419 A1 | 8/2017 |

OTHER PUBLICATIONS

Written Opinion issued on Feb. 25, 2021, in connection with International Patent Application No. PCT/KR2020/016257.

* cited by examiner

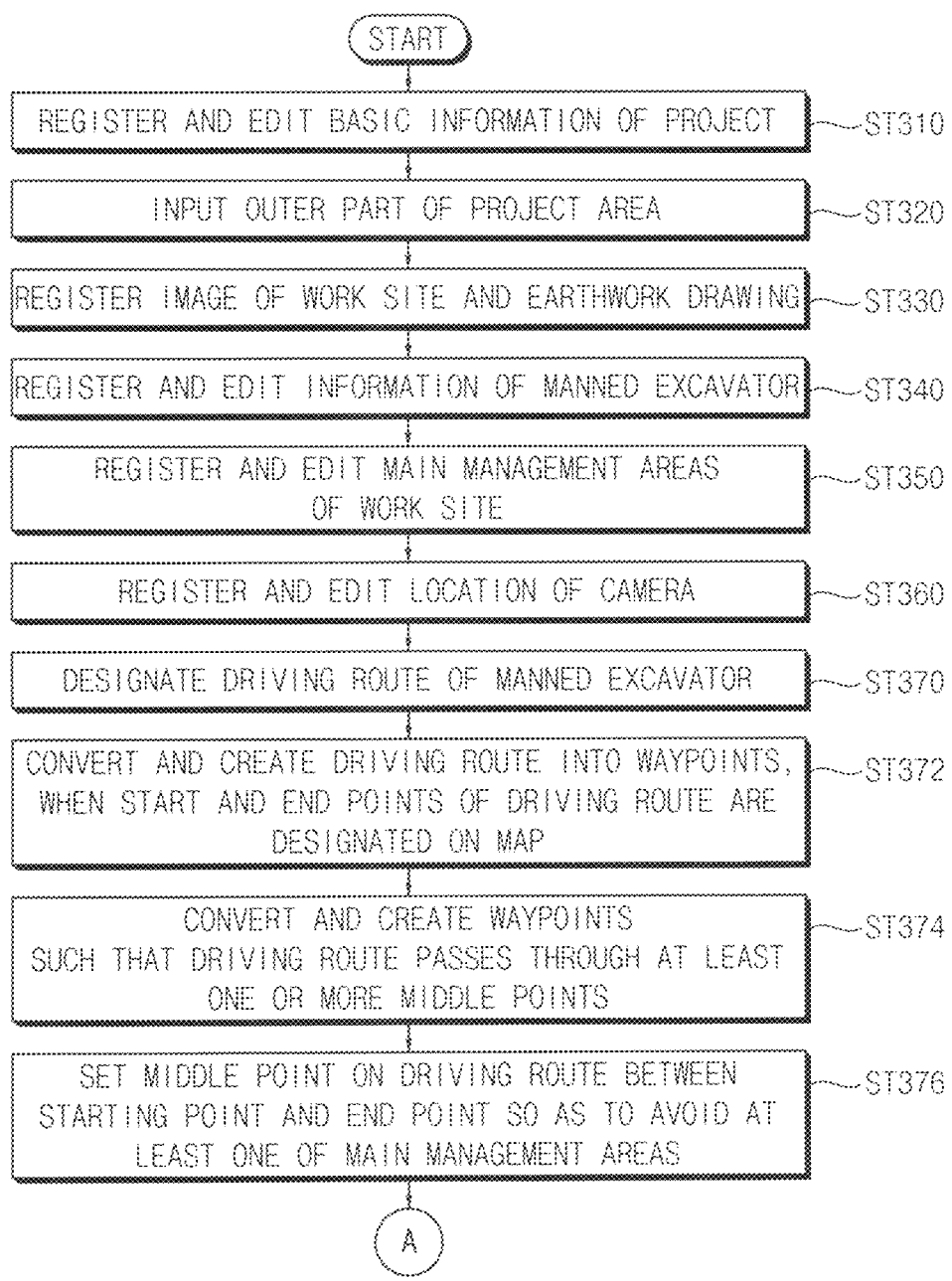

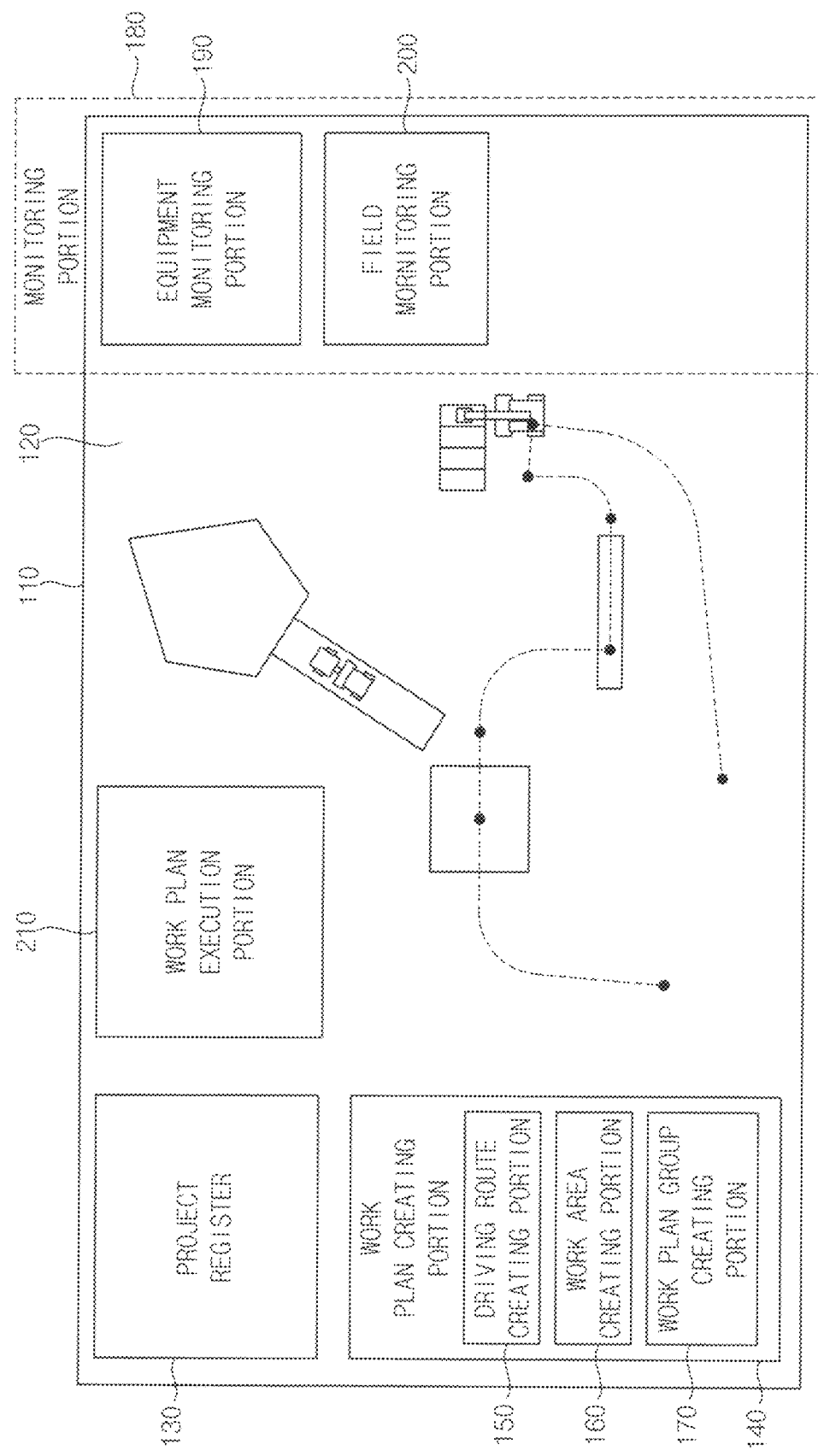

METHOD OF MAKING WORK PLANS FOR CONSTRUCTION MACHINERY

TECHNICAL FIELD

The present invention relates to a method of creating a work plan for construction machinery. More particularly, the present invention relates to a method of creating a work plan for an excavator.

BACKGROUND ART

In general, construction machinery may perform work according to a work plan. Accordingly, the work plan may have to be accurately transmitted to an operator of the construction machinery or automatic construction machinery, such that the construction machinery or the automatic construction machinery can perform a correct work according to the set work plan.

In related arts, in order to transmit the work plan to the operator of the construction machinery, a site administrator may deliver a paper printed drawing, mark a work area directly on a work site surface, or verbally explain. However, in this way, errors may occur during the transmission of the work plan, and it may take a lot of time to transmit the work plan depending on a size of a site. Therefore, there may be a difference in a work quality and speed of the site depending on a skill level of the operator of the construction machinery.

Even when only a target drawing is transmitted and the work plan is established by the operator of the construction machinery, the work quality and speed may be inevitably dependent on the skill level of the operator of construction machinery.

DISCLOSURE OF THE INVENTION

Problems to be Solved

An object of the present invention provides a construction machinery work plan making method for creating a construction machinery work plan at a work site.

Means to Solve the Problems

According to example embodiments, in a method of making work plans for construction machinery, information of the construction machinery at a work site is obtained. The information of the construction machinery is received via a wireless communication. The information of the construction machinery is displayed on a display portion of a server. A work plan of the construction machinery is created on the display portion of the server by using the information of the construction machinery and information stored in the server. The work plan is transmitted to the construction machinery.

In example embodiments, the information of the construction machinery may include at least one of location information, posture information, and state information of the construction machinery.

In example embodiments, obtaining the information of the construction machinery may include detecting at least one of location information, posture information, and state information of the construction machinery through CCTV or drone at the work site.

In example embodiments, the method of making the work plans may further include monitoring whether the construction machinery works according to the work plan.

In example embodiments, the construction machinery may include automatic construction machinery.

According to example embodiments, in a method of making work plans for construction machinery, image information of a work site and earthwork drawing information are received, and the image information and the earthwork drawing information are displayed on a display portion of a server. Information of main management areas of the work site is displayed on the display portion of the server. A driving route of the construction machinery is created on the display portion of the server. A work plan of the construction machinery is established by using the information on the display portion of the server.

In example embodiments, displaying the information of the main management areas of the work site may include registering or editing at least one obstacle selected from a puddle, a slope collapse area, a construction material and an unplanned vehicles or the construction machinery.

In example embodiments, establishing the work plan of the construction machinery may include establishing the work plan by grouping at least one of the driving route and the work site into one group.

In example embodiments, establishing the work plan of the construction machinery may include registering a project to which the construction machinery is applied, registering and editing basic information of the project, and registering and editing an area of the project.

In example embodiments, registering the project may include registering and editing information of the construction machinery, and registering and editing a location of a camera placed at the work site.

In example embodiments, establishing the work plan of the construction machinery may include overlapping the image of the work site and the earthwork drawing on a map representing the work site.

In example embodiments, creating the driving route may include designating the driving route of the construction machinery, and registering a movement condition of the construction machinery moving along the driving route.

In example embodiments, establishing the work plan may include dividing one work performed by the construction machinery into a plurality of sub-works, and registering working areas and characteristics of the sub-works.

In example embodiments, the construction machinery may include an excavator, the one work may include an excavation work, and the sub-works may include digging work having an excavation operation and a dump truck loading operation, trench work having a digging operation, and grading work having a leveling operation.

In example embodiments, the method of making the work plans may further include monitoring the construction machinery, monitoring the construction machinery includes monitoring location information, status information, work information, video and alarm of the construction machinery.

In example embodiments, monitoring the construction machinery may include monitoring a progress of earthwork at the work site, monitoring a risk of collision of the construction machinery, and monitoring an image transmitted from a camera of the registered work site when registering a project to which the construction machinery is applied.

In example embodiments, the construction machinery may include the automatic construction machinery, the method may further include transmitting the work plan to automatic construction machinery.

In example embodiments, transmitting the work plan to the automatic construction machinery may include remotely controlling starting of an automatic excavator, transmitting the work plan to the automatic excavator, pausing/restarting the automatic excavator, deleting the work plan from the automatic excavator, and emergency stopping the automatic excavator when an error occurs in the automatic excavator.

In example embodiments, the method of making the work plans may further include reviewing the work plan of the automatic excavator in advance by virtually executing the work plan.

According to example embodiments, in a method of making work plans for construction machinery, location information of the construction machinery is received from the construction machinery at a work site. Information of main management areas of the work site is displayed on a display portion of a server. A starting point and an ending point of a driving route of the construction machinery are displayed using the location information of the construction machinery on the display portion of the server. A driving route between the starting and ending points is created using the information of the main management areas. The created driving route is transmitted to the construction machinery.

In example embodiments, the driving route may be created by being converted into waypoints when the starting point and the ending point of the driving route are designated.

In example embodiments, the driving route may be created by being converted into the waypoints such that the driving route automatically passes through at least one middle point when the at least one middle point of the driving route is additionally designated.

In example embodiments, the main management areas may include an obstacle including at least one of a puddle, a slope collapse area, a construction material and an unplanned vehicles or construction machinery at the work site that obstruct a running of the construction machinery.

In example embodiments, the driving route between the starting point and the ending point may include a middle point arbitrarily set by a driving route designer to avoid at least one of the main management areas.

In example embodiments, creating the driving route may include registering a movement condition of the construction machinery moving along the driving route.

In example embodiments, the work plan may be checked on an equipment display device or an operator's mobile device.

In example embodiments, the method of making the work plans may further include monitoring whether the construction machinery works according to the work plan.

In example embodiments, the construction machinery may include automatic construction machinery.

According to example embodiments, in a method of making work plans for construction machinery, location information of the construction machinery is received from the construction machinery at a work site. A work area for the construction machinery to move and work is set. An initial location point (Platform) and a work boundary at which the construction machinery arrives at the work area and starts initial work are set. Intermediate location point (Platform) paths at which the construction machinery moves after the initial work in the work area and continuously works are set. The set intermediate location point paths are transmitted to the construction machinery.

In example embodiments, the work boundary may be created by being converted into a maximum work area space in which the construction machinery can work in place or a preset work area space at each location point (Platform).

In example embodiments, setting the work area may include crating and converting a work area space to fit the work site.

In example embodiments, setting the work area may include setting the work area by grouping at least one of the work area into a group.

In example embodiments, setting the work area may include dividing one work performed by the construction machinery into a plurality of sub-works, and registering working areas and characteristics of the sub-works.

In example embodiments, the construction machinery may include an excavator, the one work may include an excavation work, and the sub-works may include digging work having an excavation operation and a dump truck loading operation, trench work having a digging operation, and grading work having a leveling operation.

In example embodiments, the set intermediate location point paths may be checked on an equipment display device or an operator's mobile device.

In example embodiments, the method of making the work plans may further include monitoring whether the construction machinery works according to the set intermediate location point paths.

In example embodiments, the construction machinery includes automatic construction machinery.

Effects of the Invention

According to example embodiments, stored a work plan for construction machinery may be prepared by using information of the construction machinery and information of a server, and the prepared work plan may be transmitted to the construction machinery. Accordingly, it may be possible to lower a dependence of work quality and/or work time on a skill level of an operator of the construction machinery, and the work quality may be improved while shortening the work time.

BRIEF DESCRIPTION OF THE DRAWINGS

FIG. 20 is a view illustrating a display portion of a server of a work planning apparatus for construction machinery in accordance with example embodiments.

BEST MODE FOR CARRYING OUT THE INVENTION

Figure 1:
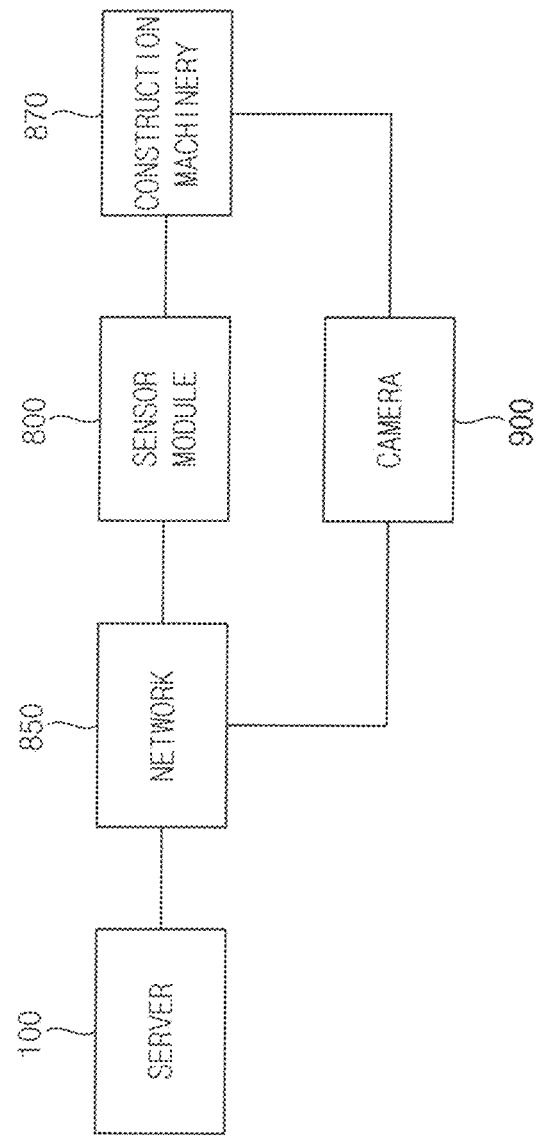
FIG. 1 is a block diagram illustrating a work planning apparatus for construction machinery in accordance with example embodiments.

Hereinafter, preferable embodiments of the present invention will be explained in detail with reference to the accompanying drawings.

Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art. In the drawings, the sizes and relative sizes of components or elements may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
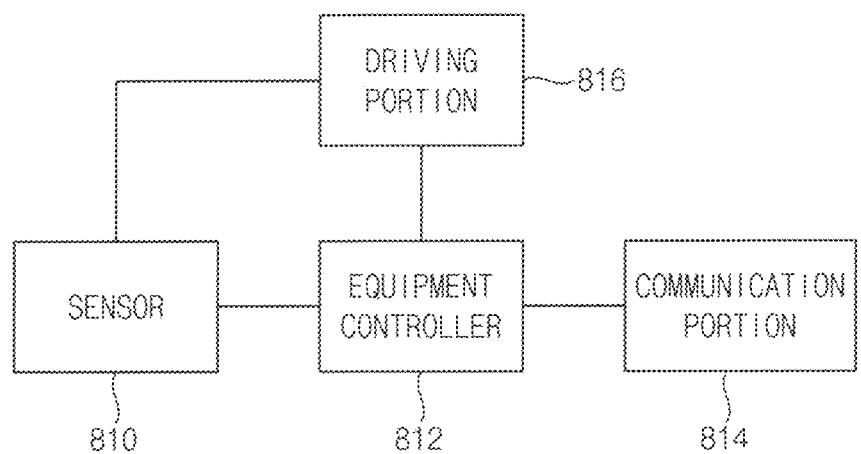
FIG. 2 is a block diagram illustrating a sensor module of a work planning apparatus in FIG. 1.
Figure 3:
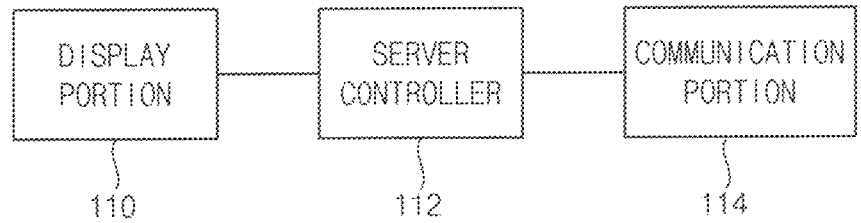
FIG. 3 is a block diagram illustrating a server of a work planning apparatus in FIG. 1.

FIG. 1 is a block diagram illustrating a work planning apparatus for construction machinery in accordance with example embodiments. FIG. 2 is a block diagram illustrating a sensor module of a work planning apparatus in FIG. 1. FIG. 3 is a block diagram illustrating a server of a work planning apparatus in FIG. 1.

Referring to FIGS. 1 to 3, a work planning apparatus for construction machinery may include a sensor module 800, a camera 900, a server 100 and a network 850.

In example embodiments, the work planning apparatus may be applied to manned construction machinery 870. In particular, the work planning apparatus of this embodiment may be applied to a manned excavator. However, the work planning apparatus of the present embodiment may be applied to various manned construction machinery other than the manned excavators.

The sensor module 800 may obtain information about the manned excavator. The sensor module 800 may include at least one sensor 810, an equipment controller 812, a communication portion 814, and a driving portion 816.

The sensor 810 may be attached to the manned excavator to detect a position, posture, state, and the like of the manned excavator. The equipment controller 812 may receive information such as the position, posture, and state of the manned excavator detected by the sensor 810. In addition, the equipment controller 812 may store the received information of the manned excavator. The communication portion 814 may transmit the information about the manned excavator stored in the equipment controller 812 to the server 100 through the network 850. The driving portion 816 may drive the sensor 810, the equipment controller 812, and the communication portion 814.

The camera 900 may be disposed at a work site to photograph the manned excavator. An image of the manned excavator photographed by the camera 900 may be transmitted to the server 100 through the network 850.

The server 100 may be connected to the sensor module 800 and the camera 900 through the network 850. The server 100 may receive the information of the manned excavator obtained by the sensor module 800 and the image of the manned excavator photographed by the camera 900. The server 100 may set the work plan of the manned excavator. In addition, the server 100 may transmit the work plan to the manned excavator. In addition, the server 100 may monitor whether the manned excavator works according to the work plan at the work site.

Specifically, the work plan created in the server 100 may include at least one driving route and/or work area of the manned excavator. The server 100 may include a display portion 110 that creates the driving route and/or the work area. The display portion 110 may create the driving route and/or the work area by touching a screen of the display portion 110. In particular, the driving route or the work area may be created without modifying a program of the server 100 using a separate program or accessing a database to individually input data into each of the driving route or the work area.

The server 100 may create the work plan by grouping at least one of the driving route or the work area created by the display portion 110 into one group.

The server 100 may create the driving route by taking a driving end point on the screen of the display portion 110. In addition, the server 100 may change and create the driving route by adding a driving start point or a driving middle point in addition to the driving end point.

The server 100 may automatically create the driving route with a default setting value. In addition, the server 100 may change the driving route by specifying a driving option value of at least one of a moving speed of the manned excavator, an angle of an upper revolving body of the manned excavator relative to a moving direction of the manned excavator, and a front state of the manned excavator.

The server 100 may create the work area by taking a work start point and a work end point on the screen of the display portion 110.

The server 100 may automatically create the work area with a basic set work. In addition, the server 100 may change the work area by designating any one of types of the work including excavation, trenching, and grading of the manned excavator. In addition, the server 100 may change the work area by designating an option value including at least one of an excavation width, an excavation length, a safety distance, an excavation depth, a dump position, and an excavation progress direction of the manned excavator.

The server 100 may automatically create the work area with the basic set work. In addition, the server 100 may change the work area by designating any one of the work areas of the manned excavator including a rectangle, a triangle, a circle, a polygon, and a sector. The server 100 may change and create the set work area by rotating it.

The server 100 may designate the work area smaller than a standard of a bucket of the manned excavator. In addition, the server 100 may display an error message on the display portion 110 when designating a small work width.

The server 100 may include a display portion 110 displaying the position of the manned excavator, a server controller 112 that sets the work plan and performs monitoring, and a communication portion 114 that transmits the work plan to the manned excavator. The communication portion 114 may transmit the work plan to a terminal installed in a cabin of the manned excavator.

Figure 4:
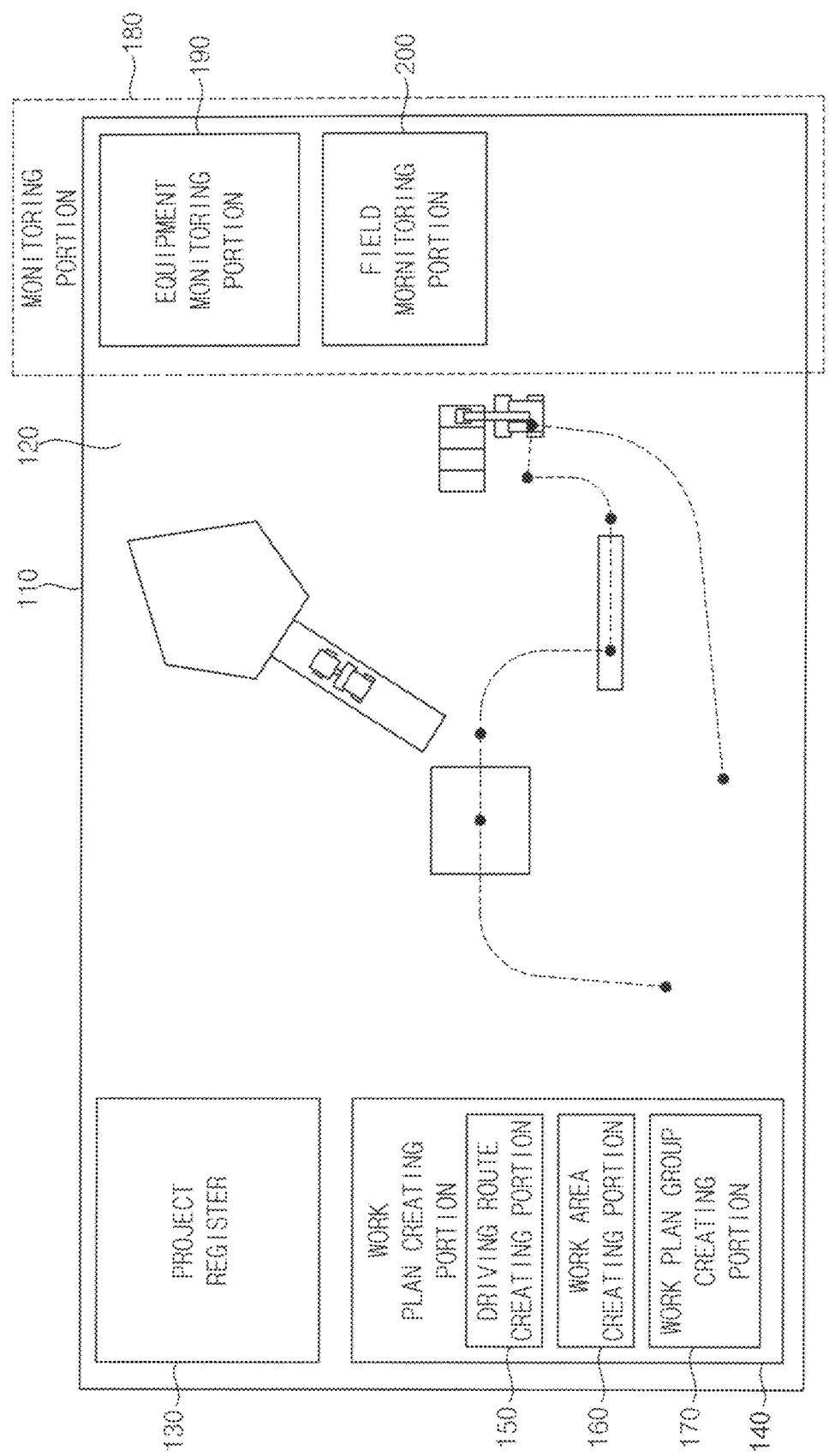
FIG. 4 is a view illustrating a display portion of a server in FIG. 1.

FIG. 4 is a view illustrating a display portion of a server in FIG. 1.

Referring to FIG. 4, a map 120 indicating the work area in which the manned excavator works may be displayed on the display portion 110. In addition, a plurality of display windows displaying components of the server controller 112 may be displayed on the display portion 110.

The server controller 112 may set an initial location point (Platform) and work boundary at which the manned excavator arrives within the work area and starts an initial work. The work boundary may be created by being converted into a maximum work area space in which the manned excavator can work in place or a preset work area space at each of the platform. This initial location point and work boundary setting may also be performed by only touching the screen of the display portion 110.

The server controller 112 may set paths of an intermediate location point (Platform) at which the manned excavator moves after the initial work within the work area to continuously work. The path setting of the intermediate location point may also be performed by only touching the screen of the display portion 110.

The server controller 112 may include a project register 130, a work plan creating portion 140, and a monitoring portion 180. The project register 130 may register a project for the manned excavator through the display portion 110. That is, the project register 130 may register the project to be completed through the use of the manned excavator through the display portion 110. The work plan creating portion 140 may create the work plan to work with the manned excavator. The monitoring portion 180 may monitor whether the manned excavator works according to the work plan. Functions of the project register 130, the work plan creating portion 140, and the monitoring portion 180 may be executed through the display portion 110.

Figure 5:
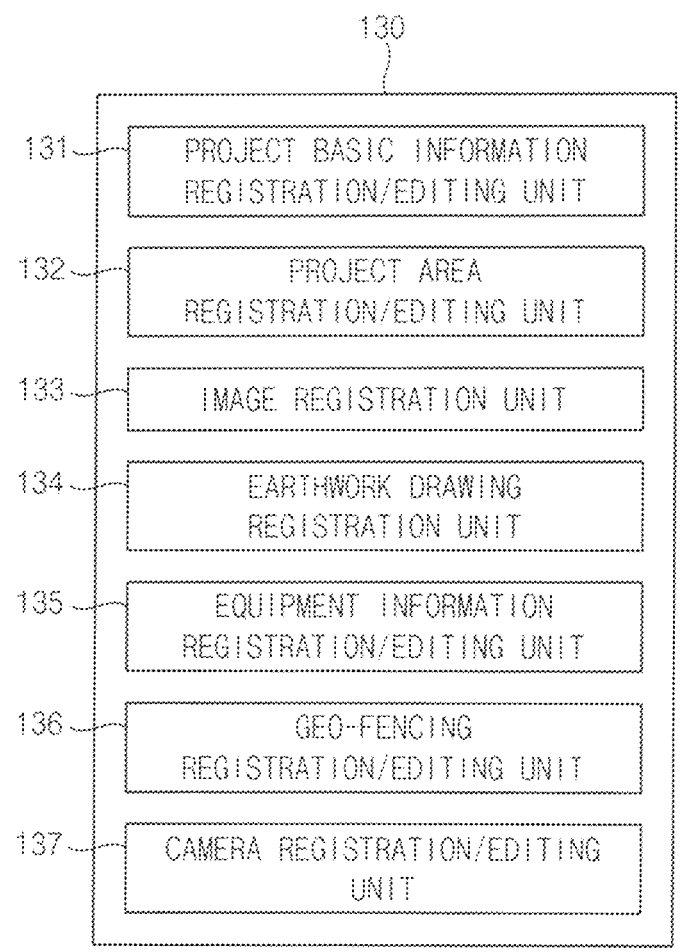
FIG. 5 is a block diagram illustrating a project register in FIG. 4.
Figure 6:
FIGS. 6 to 8 are block diagrams illustrating an image of a work site and an earthwork drawing are overlapped on a map by a project register in FIG. 5.
Figure 7:
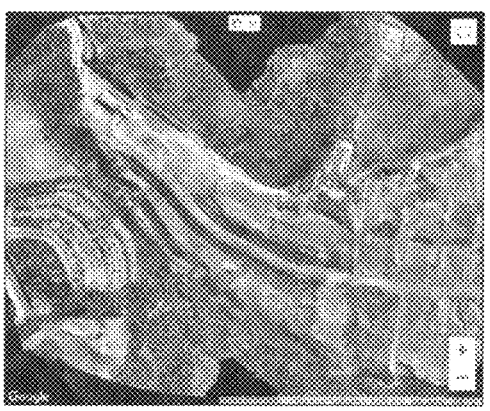
Figure 8:
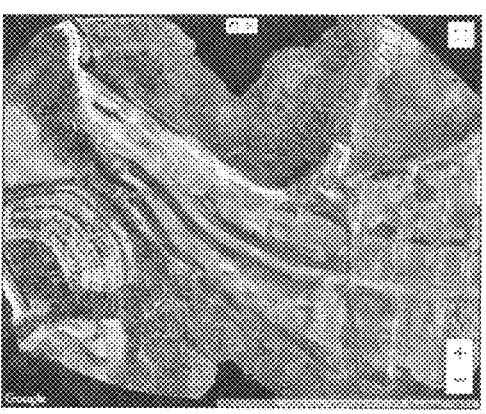

FIG. 5 is a block diagram illustrating a project register in FIG. 4. FIGS. 6 to 8 are block diagrams illustrating an image of a work site and an earthwork drawing are overlapped on a map by a project register in FIG. 5.

Referring to FIG. 5, the project register 130 may include a project basic information registration/editing unit 131, a project area registration/editing unit 132, an image registration unit 133, an earthwork drawing registration unit 134, an equipment information registration/editing unit 135, a geo-fencing registration/editing unit 136, and a camera registration/editing unit 137.

The project basic information registration/editing unit 131 may register and edit basic information of the project. For example, the project basic information registration/editing unit 131 may register and edit a project address, a period, ordering address, and construction company information.

The project area registration/editing unit 132 may input an outer part of a project area on the map 120 to designate and edit the project area.

The image registration unit 133 may register an image of the work site. For example, the image registration unit 133 may register an aerial image photographed using a drone at the work site. The image of the work site registered by the image registration unit 133 may be displayed on the map 120.

Earthwork drawing registration unit 134 may register an earthwork drawing of the work site. The earthwork drawing of the work site registered by the earthwork drawing registration unit 134 may be displayed on the map 120. The earthwork drawing may be an earthwork target drawing in which an earthwork work target is displayed.

In particular, as illustrated in FIGS. 6 to 8, the image of the work site registered by the image registration unit 133 and the earthwork drawing of the work site registered by the earthwork drawing registration unit 134 may be overlapped by the project registration portion 130 on the map 120. Accordingly, the earthwork drawing may be displayed on the map 120 overlapped on the image of the work site.

The equipment information registration/editing unit 135 may register and edit the information of the manned excavator. For example, the equipment information registration/editing unit 135 may register and edit a model name, a unique number, and basic specifications of the manned excavator.

The geo-fencing registration/editing unit 136 may register and edit main management areas of the work site. For example, the geo-fencing registration/editing unit 136 may register and edit the main management areas, such as a dangerous area of the work site, a graveyard, a highway, and the like, on the map 120.

The camera registration/editing unit 137 may register and edit a location of the camera disposed at the work site on the map 120. In addition, the camera registration/editing unit 137 may also set up a network for streaming.

Referring to FIG. 4, the work plan creating portion 140 may include a driving route creating portion 150, a work area creating portion 160, and a work plan group creating portion 170.

Figure 9:
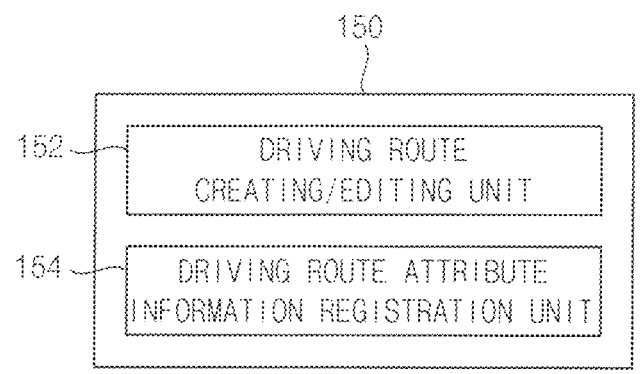
FIG. 9 is a block diagram illustrating a driving route creating portion of a work plan creating portion in FIG. 4.

FIG. 9 is a block diagram illustrating a driving route creating portion of a work plan creating portion in FIG. 4.

Figure 10:
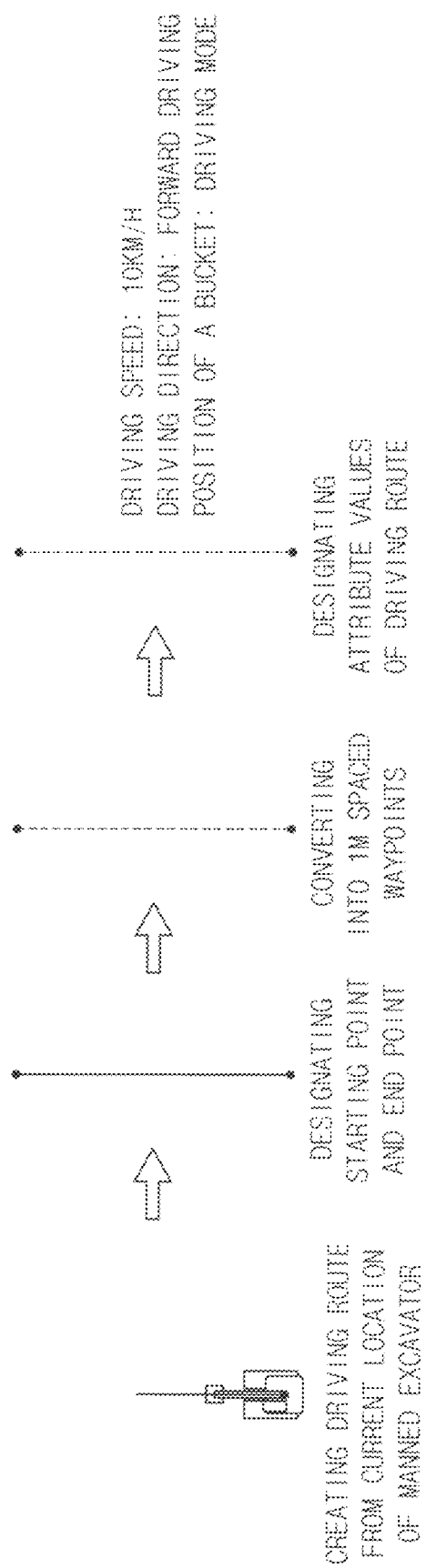
FIG. 10 is a view illustrating a process in which a driving route of construction machinery is created in a driving route creating portion in FIG. 9.

FIG. 10 is a view illustrating a process in which a driving route of construction machinery is created in a driving route creating portion in FIG. 9.

Referring to FIG. 9, the driving route creating portion 150 may include a driving route creating/editing unit 152 and a driving route attribute information registration unit 154.

The driving route creating/editing unit 152 may designate a driving route of the manned excavator on the map 120. The driving route attribute information registration unit 154 may register conditions such as the moving speed of the manned excavator, forward and backward, the angle of the upper revolving body of the manned excavator, the front state of the manned excavator, and the like.

For example, as illustrated in FIG. 10, the driving route creating/editing unit 152 may create a driving route from a current location of the manned excavator. The driving route creating/editing unit 152 may designate a starting point and an end point of the driving route. The driving route creating/editing unit 152 may convert the driving route into uniformly spaced waypoints. The driving route attribute information registration unit 154 may designate attribute values of the driving route, for example, a driving speed, a driving direction, a position of a bucket, and the like. The moving speed of the manned excavator may be determined based on a numerical value determined through the equipment information registration/editing unit 135. In addition, in order to create a safe and efficient driving route, the geo-fencing registration/editing unit 136 may overlap main areas of the work site registered on the map 120.

Figure 11:
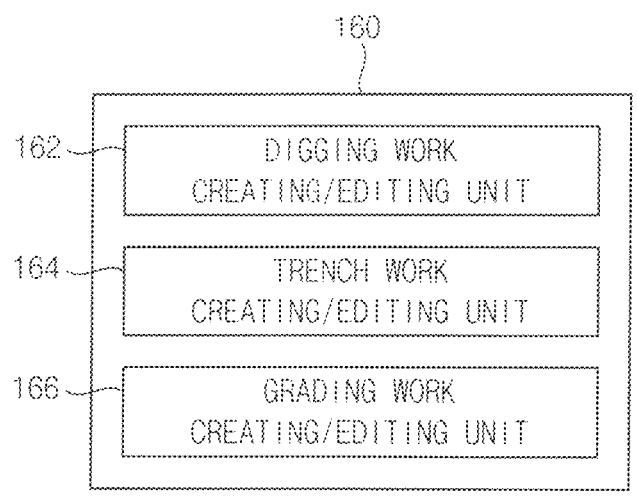
FIG. 11 is a block diagram illustrating a work area creating portion in FIG. 4.

FIG. 11 is a block diagram illustrating a work area creating portion in FIG. 4.

The work area creating portion 160 may classify any one work among the works performed by the manned excavator into a plurality of sub-works. The work area creation portion 160 may register work areas and characteristics of sub-works.

The work area creating portion 160 may create the work area by being converted into the designated work area space to fit the work site. Also, the work area creating portion 160 may create the work area by grouping at least one or more of the work area into one group.

For example, referring to FIG. 11, the work area creating portion 160 may classify an excavation work among the works performed by the manned excavator into a digging work, a trench work, and a grading work. The digging work may include an excavation operation, a dump truck loading operation, and the like. The trench work may include a line digging operation and the like. The grading work may include a leveling operation. In this case, the work area creating portion 160 may include a digging work creating/editing unit 162, a trench work creating/editing unit 164, and a grading work creating/editing unit 166.

Figure 12:
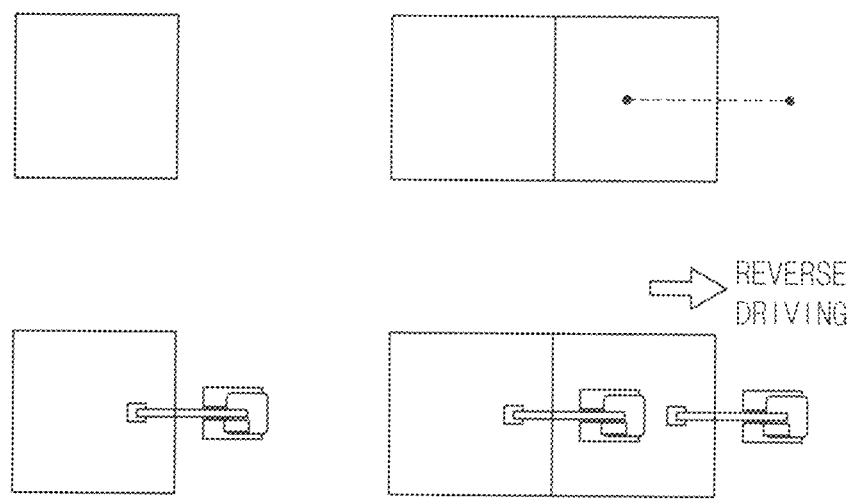
FIG. 12 is a view illustrating a work process of a digging work creating/editing unit of a work area creating portion in FIG. 11.
Figure 13:
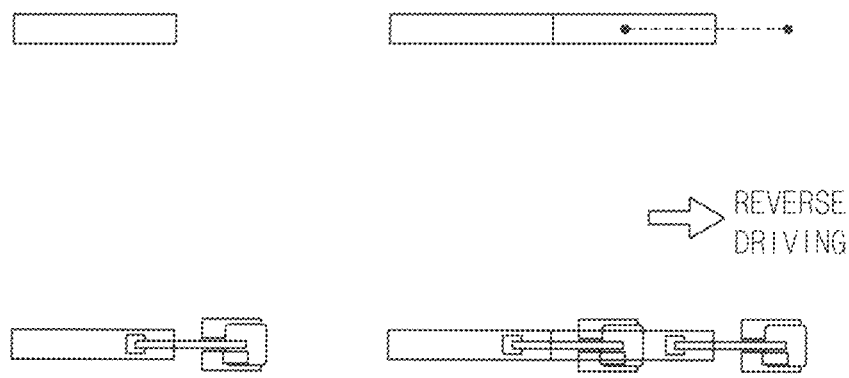
FIG. 13 is a view illustrating a work process of a trench work creating/editing unit of a work area creating portion in FIG. 11.
Figure 14:
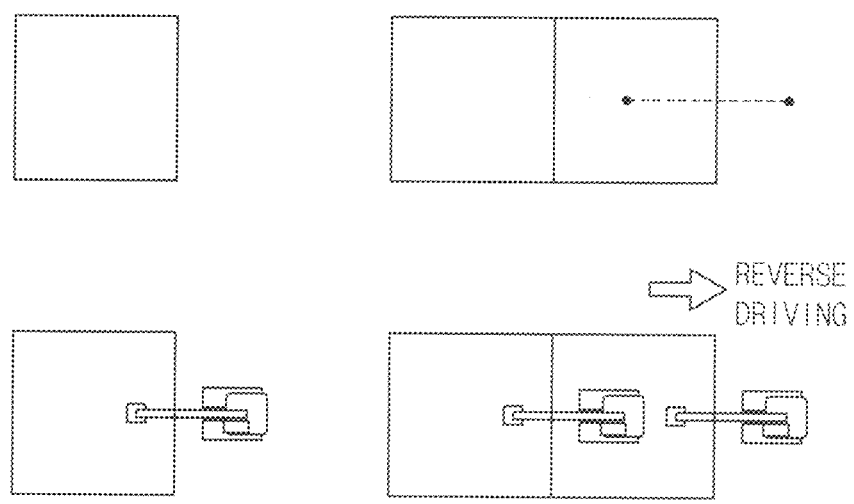
FIGS. 14 and 15 are views illustrating a work process of a grading work creating/editing unit of a work area creating portion in FIG. 11.
Figure 15:
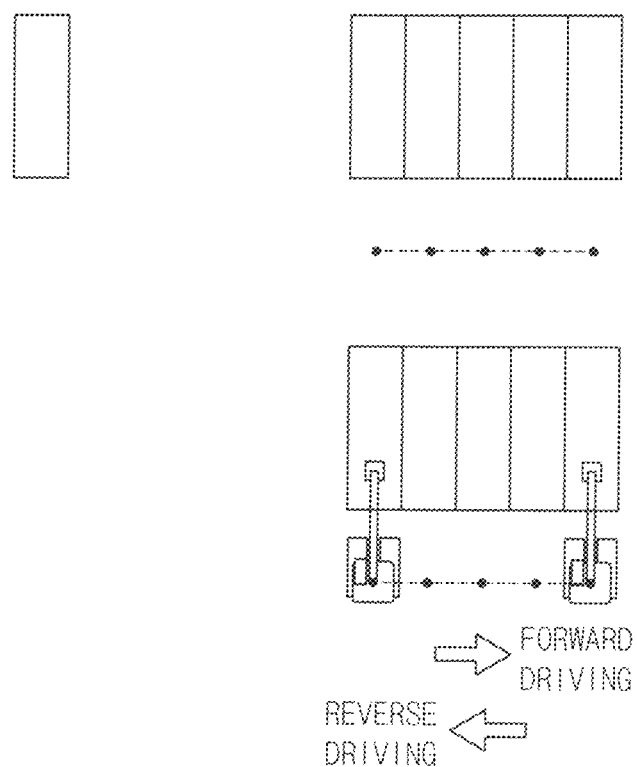

FIG. 12 is a view illustrating a work process of a digging work creating/editing unit of a work area creating portion in FIG. 11. FIG. 13 is a view illustrating a work process of a trench work creating/editing unit of a work area creating portion in FIG. 11. FIGS. 14 and 15 are views illustrating a work process of a grading work creating/editing unit of a work area creating portion in FIG. 11.

Referring to FIG. 12, the digging work creating/editing unit 162 may create an excavation area and an excavation location point (platform) of the excavator for the excavation area by inputting of excavation width, excavation length, safety distance, excavation depth, dump location, etc. The digging work creating/editing unit 162 may list one or several excavation areas in a row on the map 120.

Referring to FIG. 13, the trench work creating/editing unit 164 may perform operations similar to initial operations of the digging work creating/editing unit 162. However, the trench work creating/editing unit 164 may designate an excavation width according to a pre-registered excavator bucket standard, and select the direction of the upper revolving body of the excavator at 0 degrees and 180 degrees.

Referring to FIGS. 14 and 15, the grading work creating/editing unit 166 may divide the grading work into a front grading work and a side grading work. The front grading work may be similar to the digging work. However, in the case of a slope grading work, the grading work creating/editing unit 166 may input an inclination angle. In the case of the side grading work, the grading work creating/editing unit 166 may select whether the manned excavator is grading in a left direction or in a right direction.

Referring to FIG. 4, the work plan group creating portion 170 may create a work plan group by grouping the driving routes created by the driving route creating portion 150 and the work areas created by the work area creating portion 160 into a group. Accordingly, the driving routes and the work areas in one group may include a detail work order of the manned excavator. The work plan group created by the work plan group creating portion 170 may be transmitted to the terminal of the manned excavator. An operator may control the manned excavator to perform the works according to a sequence of the detail work of the work plan group.

Referring to FIG. 4, the monitoring portion 180 may include an equipment monitoring portion 190 and a field monitoring portion 200.

Figure 16:
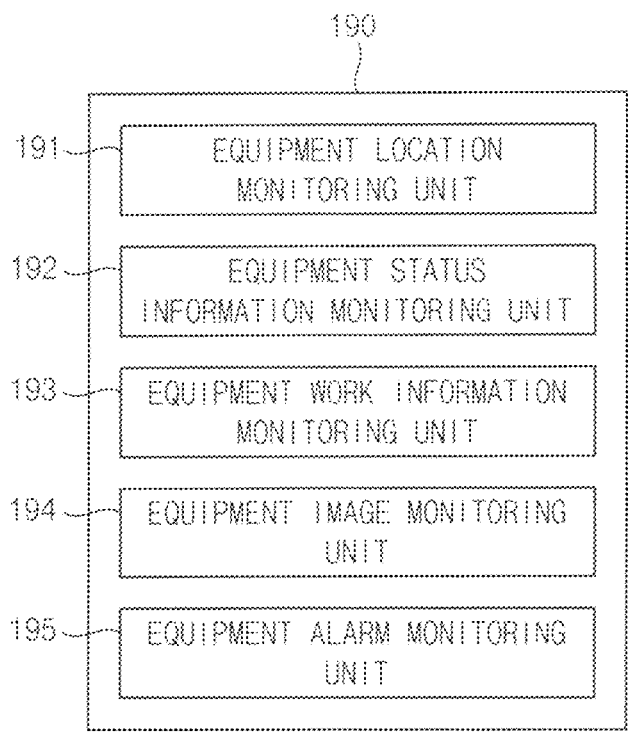
FIG. 16 is a block diagram illustrating an equipment monitoring portion of a monitoring portion in FIG. 4.

FIG. 16 is a block diagram illustrating an equipment monitoring portion of a monitoring portion in FIG. 4.

Referring to FIG. 16, the equipment monitoring portion 190 may include an equipment location monitoring unit 191, an equipment status information monitoring unit 192, an equipment work information monitoring unit 193, an equipment image monitoring unit 194, and an equipment alarm monitoring unit 195.

The equipment location monitoring unit 191 may monitor the location of the manned excavator on the map 120. The equipment status monitoring portion 192 may monitor equipment states such as basic information of equipment, fuel information, instrument information, and operation time information. The equipment work information monitoring unit 193 may monitor a current work situation in the transmitted work plan group. The equipment image monitoring unit 194 may monitor information obtained by a camera, a sensor, etc. attached to the manned excavator by a method such as an image. The equipment alarm monitoring unit 195 may monitor abnormalities of dangerous elements or parts of the manned excavator, such as obstacles, and may provide an alarm with an alarm or the like when an abnormality occurs.

Figure 17:
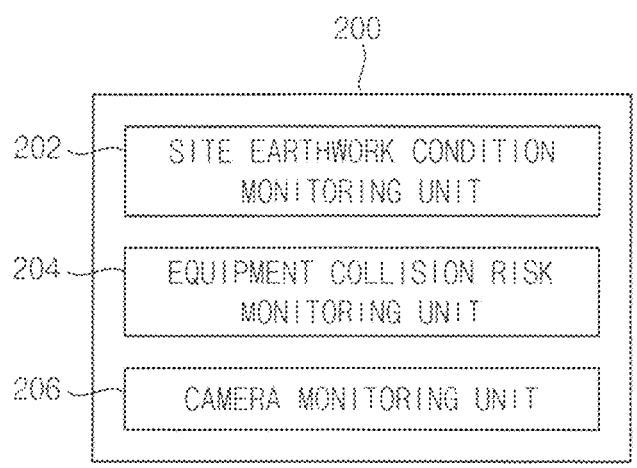
FIG. 17 is a block diagram illustrating a field monitoring portion of a monitoring portion in FIG. 4.

FIG. 17 is a block diagram illustrating a field monitoring portion of a monitoring portion in FIG. 4.

Referring to FIG. 17, the field monitoring portion 200 may include a site earthwork condition monitoring unit 202, an equipment collision risk monitoring unit 204, and a camera monitoring unit 206.

The site earthwork condition monitoring unit 202 may monitor a work progress compared to a planned fill amount of the work site, the work progress compared to a planned cut amount, and the work progress compared to a total earthwork amount. The equipment collision risk monitoring unit 204 may monitor a collision risk between manned excavators. The camera monitoring unit 206 may monitor image information transmitted from the camera registered in the project register 130.

Figure 18:
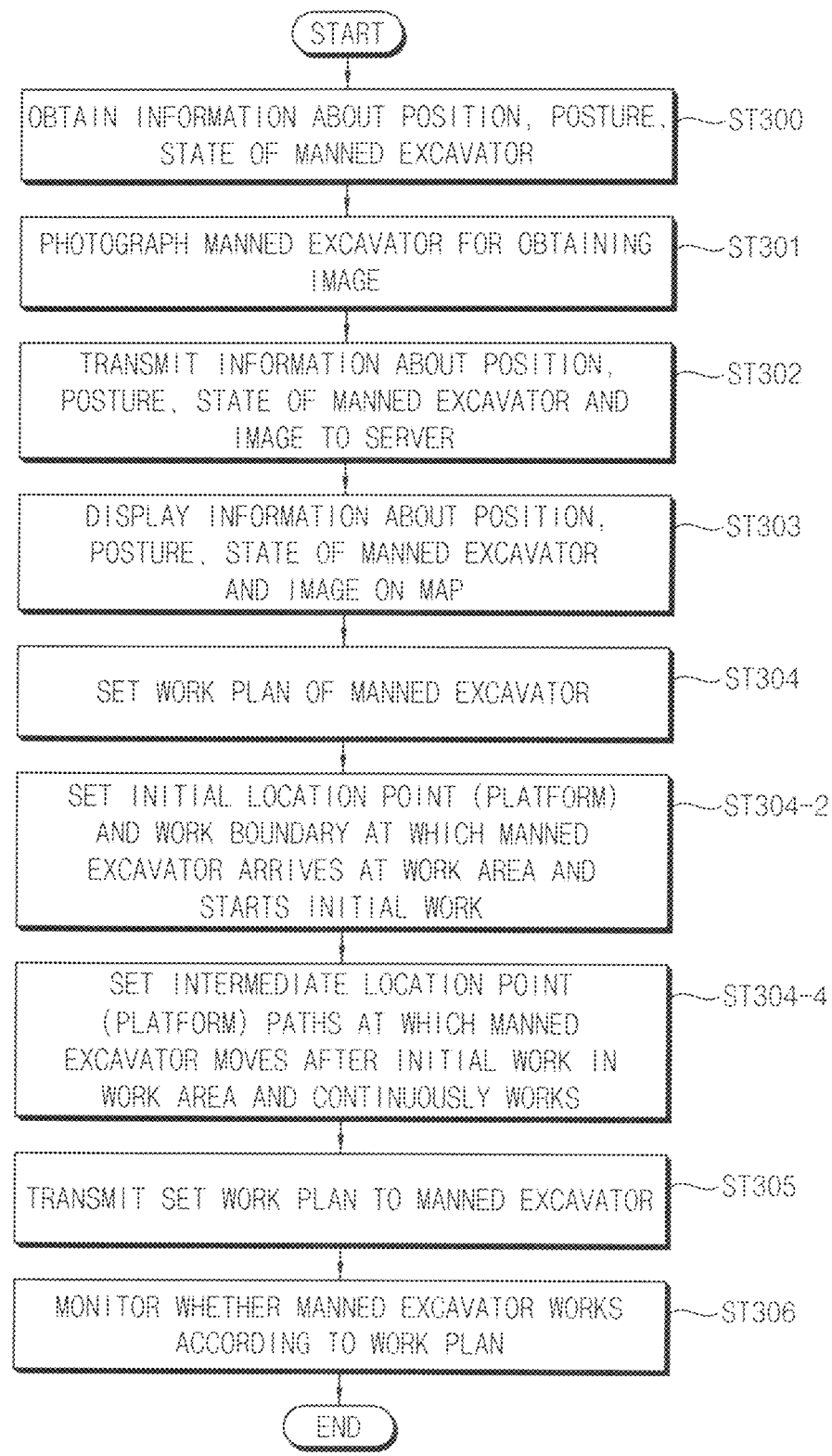
FIG. 18 is a flow chart illustrating a method of making a work plan for construction machinery using an apparatus in FIG. 1.
Figure 19B:
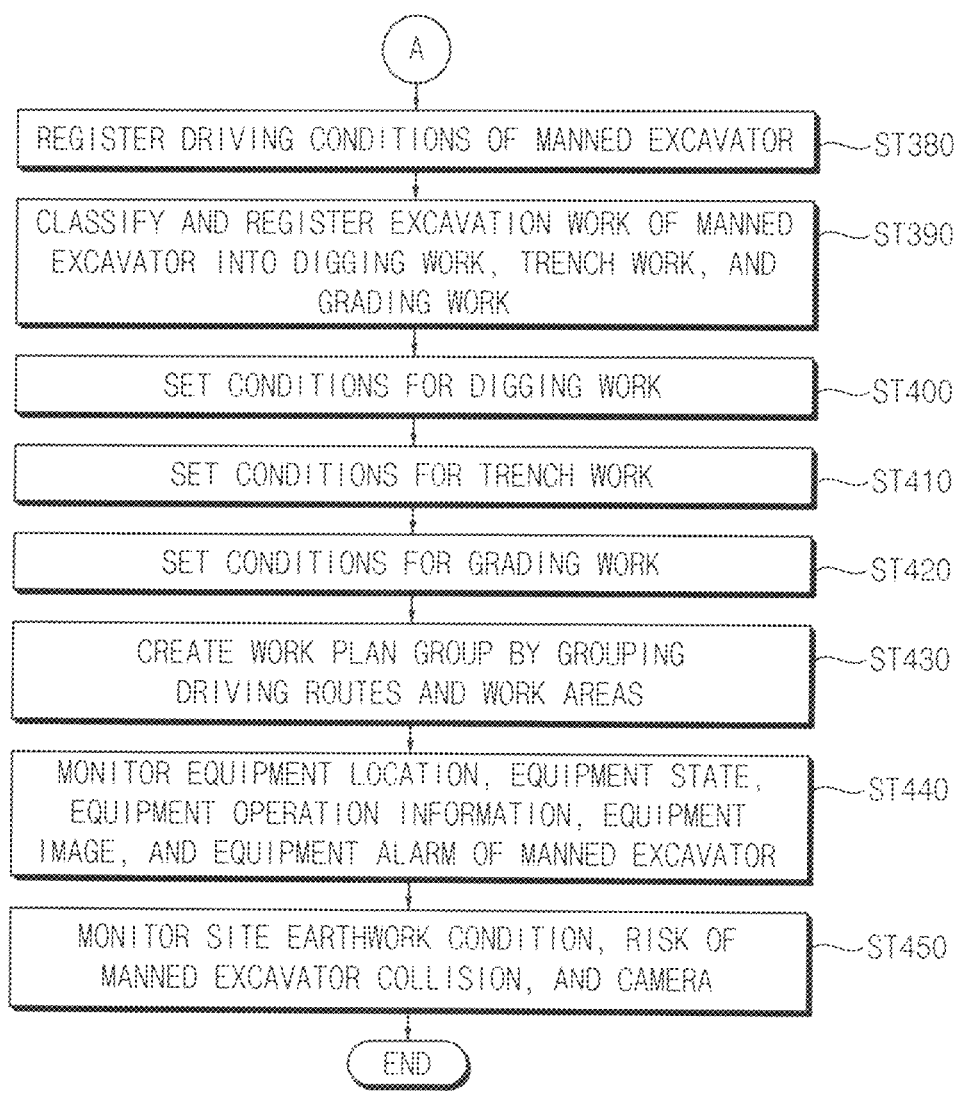
FIG. 19 is a flow chart illustrating a method of setting a work plan in FIG. 18.

FIG. 18 is a flow chart illustrating a method of making a work plan for construction machinery using an apparatus in FIG. 1. FIG. 19 is a flow chart illustrating a method of setting a work plan in FIG. 18.

Referring to FIGS. 1 and 18, in step ST300, the sensor 810 may obtain the information about the manned excavator at the work site. For example, the information of the manned excavator may include the information about the position, posture, state, etc. of the manned excavator. In addition, the information of the manned excavator may detect the position, posture, and state information of the manned excavator by using CCTV or drones at the work site.

In step ST301, the camera 900 may photograph the manned excavator.

In step ST302, the communication portion 814 of the sensor module 800 may transmit the information of the manned excavator to the communication portion 114 of the server 100 via wireless communication. The information of the manned excavator may include position, posture, and state of the manned excavator detected by the sensor 810, and the image of the manned excavator photographed by the camera 900, and the like.

In step ST303, the display portion 110 of the server 100 may display the information of the manned excavator, that is, the position, posture, and state of the manned excavator, and the image of the manned excavator on the map 120.

In step ST304, the server controller 112 of the server 100 may set the work plan of the manned excavator according to the information of the manned excavator. The work plan may include at least one of the driving route and/or the work area.

The display portion 110 may create the driving route or the work area. In particular, without modifying the program of the server 100 using a separate program or accessing the database to individually input data into each of the driving route or the work area, the driving route and/or the work areas may be created.

The work area may be created by being converted into a designated work area space to fit the work site. Also, the work area may be created by grouping at least one work area into one group.

In step ST304-2, the server controller 112 may set the initial location point (Platform) and the work boundary at which the manned excavator arrives within the work area and starts the initial work. The working boundary may be created by being converted into the maximum work area space in which the manned excavator can work in place or the preset work area space at each platform. This initial location point and work boundary setting may also be performed by only touching the screen of the display portion 110.

In step ST304-4, the server controller 112 may set the paths of the intermediate location point (Platform) to which the manned excavator moves after the initial work within the work area and continuously works. The path setting of the intermediate location point may also be performed by only touching the screen of the display portion 110.

In step ST305, the communication portion 114 of the server 100 may transmit the set work plan to the manned excavator. That is, the communication portion 114 of the server 100 may transmit the set work plan to the communication portion 814 of the sensor module 800 attached to the manned excavator. In addition, the operator of the manned excavator may check the work plan through a display device of the manned excavator or an operator's mobile device.

In step ST306, the server controller 112 of the server 100 may monitor whether the manned excavator works according to the work plan at the work site.

Referring to FIG. 19, in step ST310, an administrator may register and edit the basic information of the project to which the manned excavator is to be applied through the project basic information registration/editing unit 131. For example, the administrator may register and edit the project address, period, ordering address, construction company information, etc. through the project basic information registration/editing unit 131.

In step ST320, the administrator may input the outer part of the project area on the map 120 through the project area registration/editing unit 132 to designate and edit the project area.

In step ST330, the administrator may register the image of the work site through the image registration unit 133, and the earthwork drawing of the work site through the earthwork drawing registration unit 134. In particular, the project register 130 may overlap the image of the work site and the earthwork drawing of the work site on the map 120.

In step ST340, the administrator may register and edit the information of the manned excavator through the equipment information registration/editing unit 135. For example, the administrator may register and edit the model name, the unique number, the basic specifications, etc. of the manned excavator through the equipment information registration/editing unit 135.

In step ST350, the administrator may register and edit main management areas of the work site through the geo-fencing registration/editing unit 136. For example, the administrator may register and edit the main management areas, such as the dangerous area of the work site, the graveyard, the highway, and the like, on the map 120 through the geo-fencing registration/editing unit 136. For example, the main management area of the work site may include puddles on the work site, slope collapse areas, construction materials, unplanned vehicles or the construction machinery, and the like.

In step ST360, the administrator may register and edit the location of the camera 900 disposed at the work site on the map 120 through the camera registration/editing unit 137.

In step ST370, the administrator may designate the driving route of the manned excavator on the map 120 through the driving route creating/editing unit 152. The driving route may include the starting point and the ending point of the manned excavator.

In step ST372, when the starting and ending points of the driving route are designated on the map 120, the driving route may be converted into waypoints and may be created.

In step ST374, when at least one or more middle points are additionally designated to the driving route, the waypoints may be automatically converted and created such that the driving route passes through at least one or more middle points.

In step ST376, the middle point may be arbitrarily set by the administrator on the driving route between the starting point and the end point so as to avoid at least one of the main management areas.

In step ST380, the administrator may register conditions such as the moving speed of the manned excavator, the forward and the backward, the angle of the upper revolving body of the manned excavator, the front state of the manned excavator, and the like through the driving route attribute information registration unit 154.

In step ST390, the administrator may classify and register the excavation work of the manned excavator into the digging work, the trench work, and the grading work through the work area creating portion 160. The digging work may include an excavation operation, a dump truck loading operation, and the like. The trench work may include a line digging operation and the like. The grading work may include a leveling operation.

In step ST400, the administrator may set the conditions for the digging work through the digging work creating/editing unit 162. For example, the administrator may create the excavation area and the excavation platform of the excavator for the excavation area by inputting the excavation width, excavation length, safety distance, excavation depth, dump position, etc. through the digging work creating/editing unit 162. In addition, the administrator may list one or several excavation areas on the map 120 through the digging work creating/editing unit 162.

In step ST410, the administrator may set the conditions for a trench work through the trench work creating/editing unit 164. For example, the administrator may input an operation command similar to the initial operations of the digging work creating/editing unit 162 to the trench work creating/editing unit 164. However, the trench work creating/editing unit 164 may designate an excavation width according to a pre-registered excavator bucket standard, and select the direction of the upper revolving body of the excavator at 0 degrees and 180 degrees.

In step ST420, the administrator may set the conditions of the grading work through the grading work creating/editing unit 166. For example, the administrator may divide the grading work into the front grading work and the side grading work through the grading work creating/editing unit 166. An administrator may set the conditions for front and side grading works through the grading work creating/editing unit 166.

In step ST430, the administrator may create the work plan group by grouping the driving routes created by the driving route creating portion 150 through the work plan group creating portion 170 and the work areas created by the work area creating portion 160. Accordingly, the driving routes and the work areas included in one group serving as the detail work order of the manned excavator may be generated. The work plan group created by the work plan group creating portion 170 may be transmitted to the terminal of the manned excavator.

In step ST440, the administrator may monitor the equipment location, equipment state, equipment operation information, equipment image, and equipment alarm through the equipment monitoring portion 190.

In step ST450, the administrator may monitor a site earthwork condition, a risk of equipment collision, and the camera through the field monitoring portion 200. The monitoring of the camera may include monitoring the image transmitted from the camera of the registered work site when registering the project to which the manned excavator is to be applied.

Figure 21:
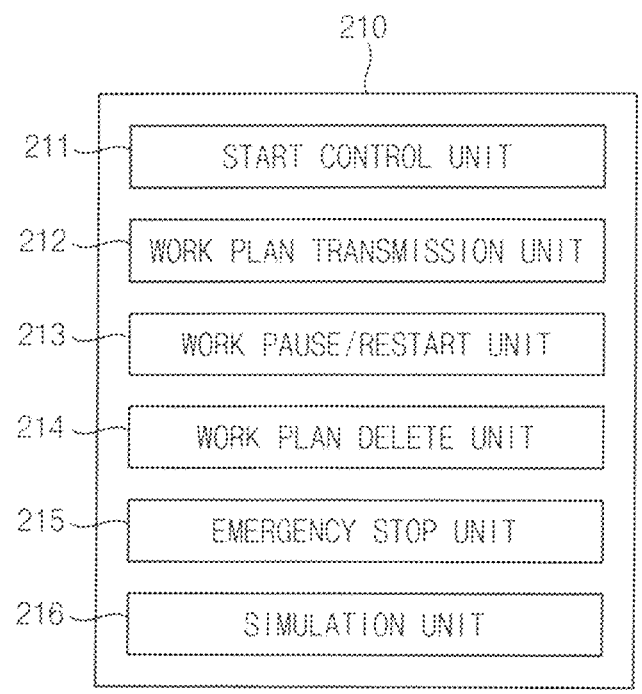
FIG. 21 is a block diagram illustrating a work plan execution portion in FIG. 20.

FIG. 20 is a view illustrating a display portion of a server of a work planning apparatus for construction machinery in accordance with example embodiments. FIG. 21 is a block diagram illustrating a work plan execution portion in FIG. 20.

The work planning apparatus for the construction machinery may be substantially the same as or similar to the work planning apparatus described with reference to FIG. 1 except for the server controller including the work plan execution portion. Thus, same or similar components are denoted by the same or similar reference numerals, and repeated descriptions of the same components will be omitted.

Referring to FIGS. 20 and 21, the work planning apparatus of the present embodiment may be applied to automatic construction machinery, for example, an automatic excavator. Accordingly, the server controller 112 of the work planning apparatus of the present embodiment may further include a work plan execution portion 210 for controlling the operation of the automatic excavator.

Figure 22:
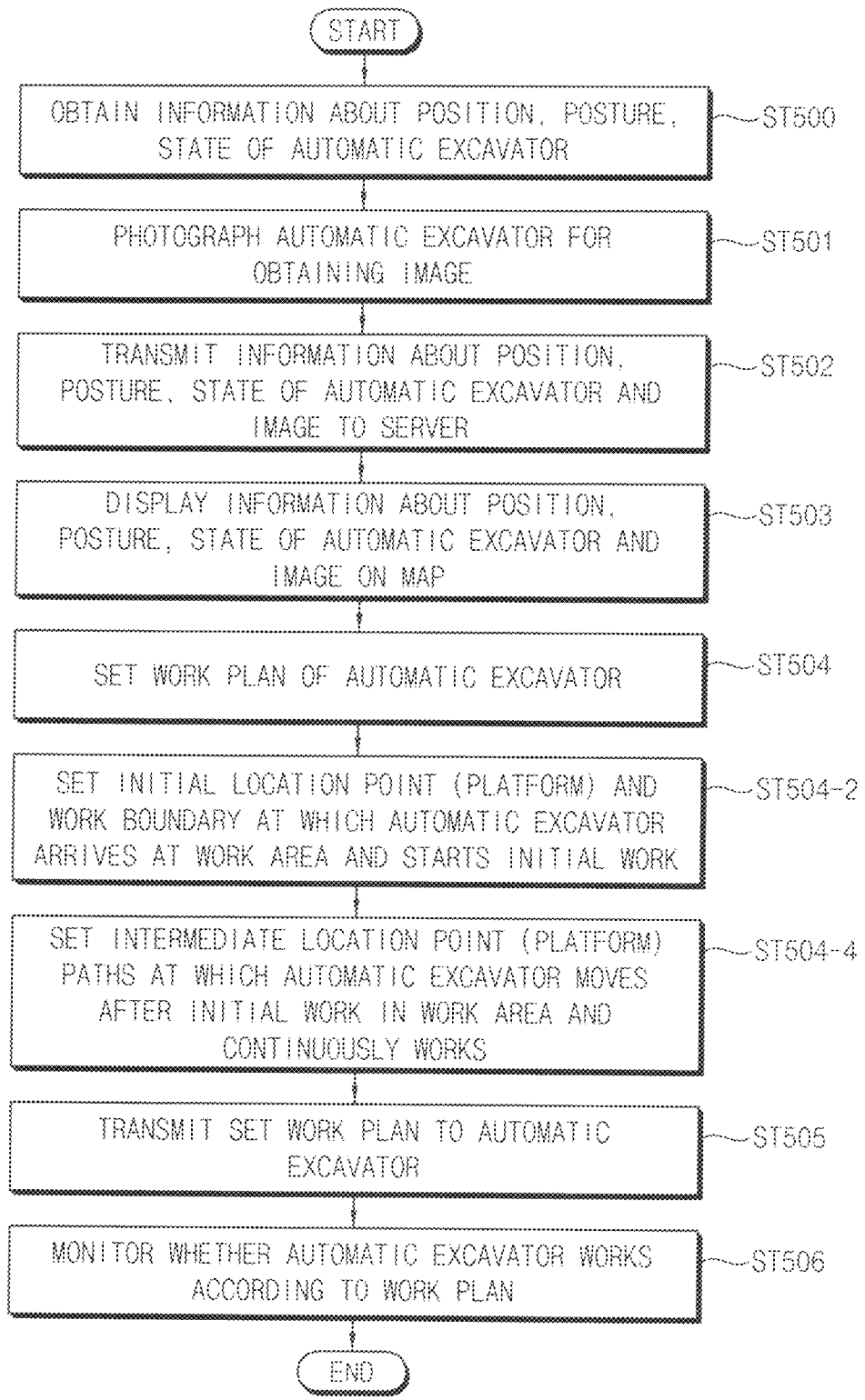
FIG. 22 is a flow chart illustrating a method of making a work plan for construction machinery using an apparatus in FIG. 20.
Figure 23A:
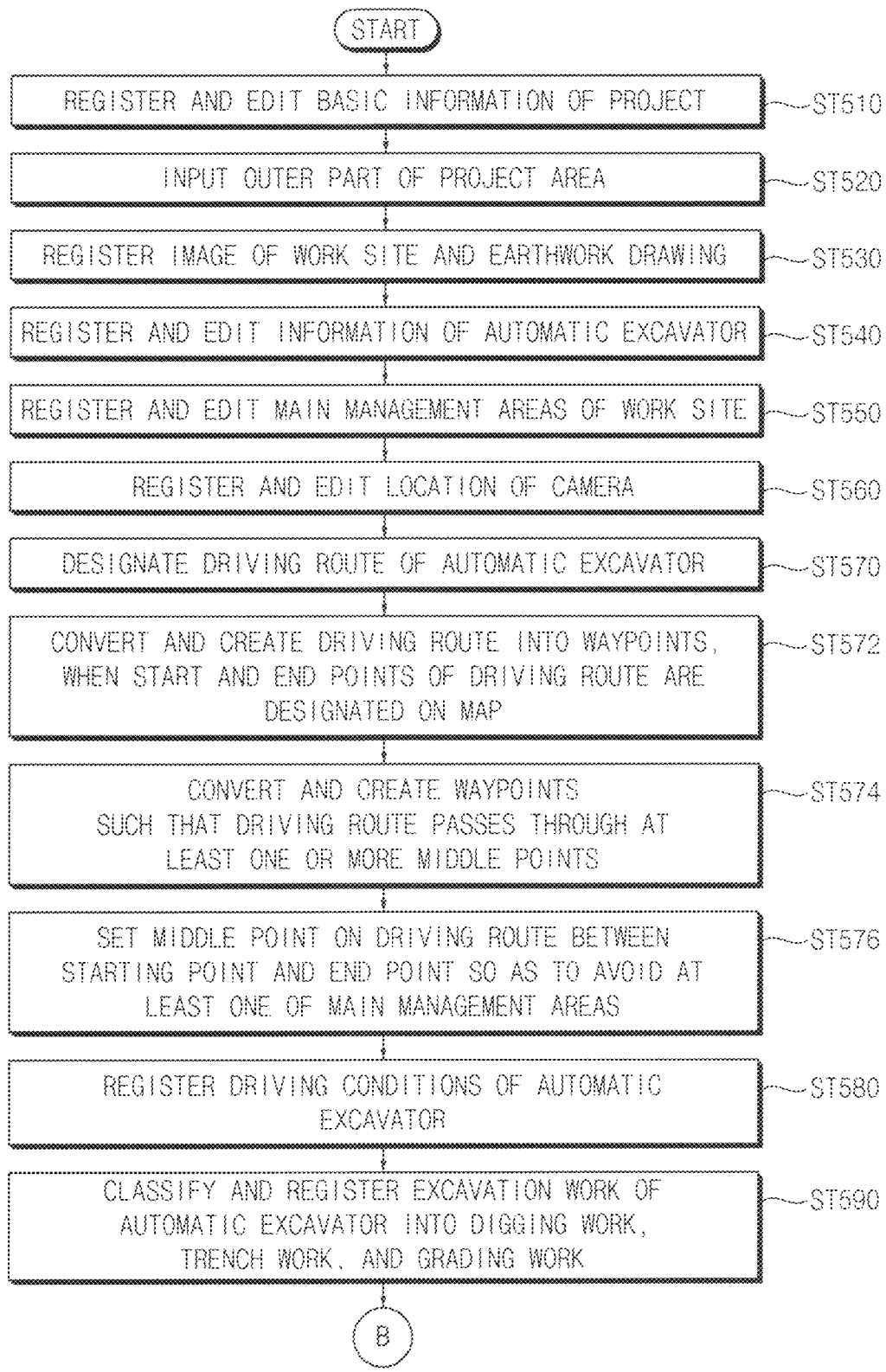
FIGS. 23A and 23B are flow charts illustrating a method of setting a work plan in FIG. 22.
Figure 23B:
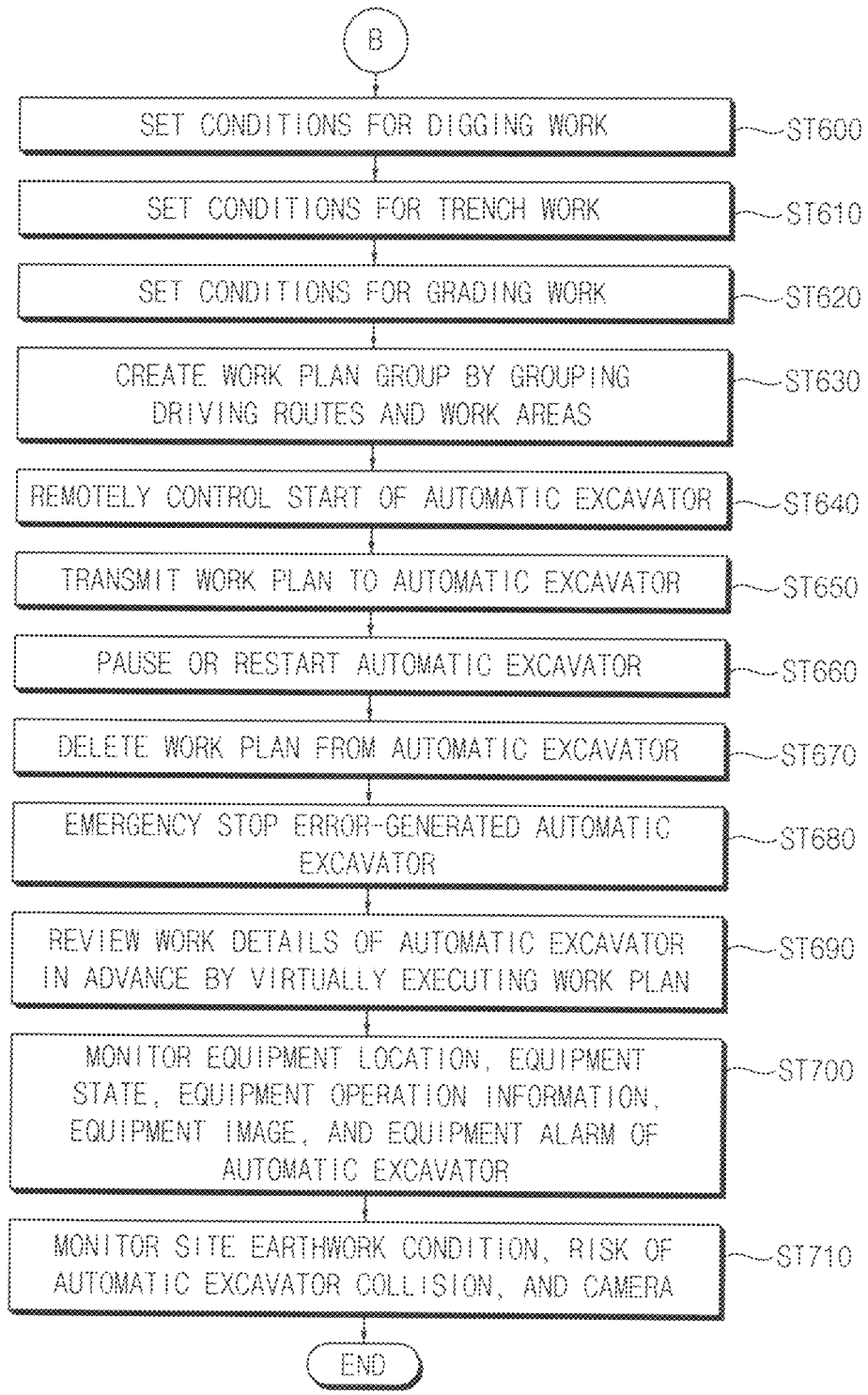

The work plan execution portion 210 may include a starting control portion 211 for remotely controlling the starting of the automatic excavator, a work plan transmission unit 212 for transmitting the work plan to the automatic excavator, work pause/restart unit 213 for temporarily stopping/re-operating the automatic excavator, a work plan delete unit 214 for deleting the work plan from the automatic excavator, emergency stop unit 215 for emergency stop of the automatic excavator when an error occurs in the automatic excavator, a simulation unit 216 for simulating work contents of the automatic excavator in advance by virtually executing a work plan execution FIG. 22 is a flow chart illustrating a method of making a work plan for construction machinery using an apparatus in FIG. 20. FIGS. 23A and 23B are flow charts illustrating a method of setting a work plan in FIG. 22.

Referring to FIGS. 20 and 22, in step ST500, the sensor 810 may obtain information about the automatic excavator at the work site. For example, the information of the automatic excavator may include information about the position, posture, state, etc. of the automatic excavator. In addition, the information of the automatic excavator may detect the position, posture, and state information of the automatic excavator using CCTV or drones at the work site.

In step ST501, the camera 900 may photograph the automatic excavator.

In step ST502, the communication portion 814 of the sensor module 800 may transmit the information of the automatic excavator, such as the position, posture, and state of the automatic excavator detected by the sensor 810, and the image of the automatic excavator photographed by the camera 900 to the communication portion 114 of the server 100 through the wireless communication.

In step ST503, the display portion 110 of the server 100 may display the information of the automatic excavator, that is, the position, posture and state of the automatic excavator, and the image of the automatic excavator on the map 120.

In step ST504, the server controller 112 of the server 100 may set the work plan of the automatic excavator according to the information of the automatic excavator. The work plan may include at least one of the driving route and/or the work area.

The display portion 110 may create the driving route and/or the work area by touching the screen of the display portion 110. In particular, the driving route or the work area may be created without modifying the program of the server 100 using the separate program or accessing the database to individually input data into each of the driving route or the work area.

The work area may be created by being converted into the designated work area space to fit the work site. Also, the work area may be created by grouping at least one work area space into one group.

In step ST504-2, the server controller 112 may set the initial location point (Platform) and the work boundary at which the automatic excavator arrives within the work area and starts the initial work. The working boundary may be created by being converted into the maximum work area space or the preset work area space where the automatic excavator may work in place at each platform. This initial location point and work boundary setting may also be performed by only touching the screen of the display portion 110.

In step ST504-4, the server controller 112 may set the intermediate location point (Platform) paths for the automatic excavator to move and continuously work after the initial work within the work area. This intermediate location point path setting may also be performed by only touching the screen of the display portion 110.

In step ST505, the communication portion 114 of the server 100 may transmit the set work plan to the automatic excavator. That is, the communication portion 114 of the server 100 may transmit the set work plan to the communication portion 814 of the sensor module 800 attached to the automatic excavator. In addition, the administrator of the automatic excavator may check the work plan through an administrator's mobile device.

In step ST506, the server controller 112 of the server 100 may monitor whether the automatic excavator works according to the work plan at the work site.

Referring to FIGS. 23A and 23B, in step ST510, the administrator may register and edit the basic information of the project through the project basic information registration/editing unit 131.

In step ST520, the administrator may input the outer part of the project area on the map 120 through the project area registration/editing unit 132 to designate and edit the project area.

In step ST530, the administrator may register the image of the work site through the image registration unit 133, and the earthwork drawing of the work site through the earthwork drawing registration unit 134. In particular, the project registration portion 130 may overlap the image of the work site and the earthwork drawing of the work site on the map 120.

In step ST540, the administrator may register and edit the information of the automatic excavator through the equipment information registration/editing unit 135. For example, the administrator may register and edit the model name, the unique number, the basic specifications, etc. of the automatic excavator through the equipment information registration/editing unit 135.

In step ST550, the administrator may register and edit the main management areas of the work site through the geo-fencing registration/editing unit 136. For example, the administrator may register and edit the main management areas such as the dangerous area of the work site, the graveyard, the highway, etc. on the map 120 through the geo-fencing registration/editing unit 136.

In step ST560, the administrator may register and edit the location of the camera disposed at the work site on the map 120 through the camera registration/editing unit 137.

In step ST570, the administrator may designate the driving route of the automatic excavator on the map 120 through the driving route creating/editing unit 152. The driving route may include the starting point and the ending point of the automatic excavator.

In step ST572, when the starting and ending points of the driving route are designated on the map 120, the driving route may be converted into the waypoints and created.

In step ST574, when at least one or more middle points are additionally designated to the driving route, the waypoints may be automatically converted and created such that the driving route passes through the at least one or more middle points.

In step ST576, the middle point may be arbitrarily set by the administrator on the driving route between the starting point and the end point so as to avoid at least one of the main management areas.

In step ST580, the administrator may register the conditions such as the moving speed of the automatic excavator, the forward and the backward, the angle of the upper revolving body of the automatic excavator, the front state of the automatic excavator, and the like through the driving route attribute information registration unit 154

In step ST590, the administrator may classify and register the excavation work of the automatic excavator through the work area creating portion 160 into the digging work, the trench work, and the grading work.

In step ST600, the administrator may set the conditions for the digging work through the digging work creating/editing unit 162. For example, the administrator may create the excavation area and the excavation platform of the excavator for the excavation area by inputting the excavation width, the excavation length, the safety distance, the excavation depth, and the dump position through the digging work creating/editing unit 162. In addition, the administrator may list one or several excavation areas on the map 120 through the digging work creating/editing unit 162.

In step ST610, the administrator may set the conditions for the trench work through the trench work creating/editing unit 164. For example, the administrator may input the operation command similar to the initial operations of the digging work creating/editing unit 162 to the trench work creating/editing unit 164. However, the trench work creating/editing unit 164 may designate the excavation width according to the pre-registered excavator bucket standard, and select the direction of the upper revolving body of the excavator at 0 degrees and 180 degrees.

In step ST620, the administrator may set the conditions of the grading work through the grading work creating/editing unit 166. For example, the administrator may divide the grading work into the front grading work and the side grading work through the grading work creating/editing unit 166. The administrator may set the conditions for the front and side grading works through the grading work creating/editing unit 166.

In step ST630, the administrator may create the work plan group by grouping the driving routes created by the driving route creating portion 150 and the work areas created by the work area creating portion 160 through the work plan group creating portion 170. Accordingly, the driving routes and the work areas included in one group serving as the detail work order of the automatic excavator may be created. The work plan group created by the work plan group creating portion 170 may be transmitted to the automatic excavator.

In step ST640, the administrator may remotely control the start of the automatic excavator through the start control unit 211.

In step ST650, the administrator may transmit the work plan to the automatic excavator through the work plan transmission unit 212.

In step ST660, the administrator may selectively pause or restart the automatic excavator through the work pause/restart unit 213.

In step ST670, the administrator may selectively delete the work plan from the automatic excavator through the work plan delete unit 214.

In step ST680, when an error occurs in the automatic excavator, the administrator may emergency stop the error-generated automatic excavator through the emergency stop unit 215.

In step ST690, the administrator may review work details of the automatic excavator in advance by virtually executing the work plan through the simulation unit 216. The simulations may be performed before the automatic excavator is actually put into operation.

In step ST700, the administrator may monitor the equipment location, the equipment state, the equipment operation information, the equipment image, and the equipment alarm through the equipment monitoring portion 190.

In step ST710, the administrator may monitor the site earthwork condition, the risk of the equipment collision, and the camera through the field monitoring portion 200.

As described above, according to the present embodiments, it may be possible to create the work plan of the construction machinery by using the information of the construction machinery and the information of the server, and to transmit the created work plan to the construction machinery. Accordingly, it may be possible to lower the dependence of the work quality and/or the work time on the skill level of the operator of the construction machinery, and the work quality may be improved while shortening the work time.

The present invention has been explained with reference to preferable embodiments, however, those skilled in the art may understand that the present invention may be modified or changed without being deviated from the concept and the scope of the present invention disclosed in the following claims.

THE DESCRIPTION OF THE REFERENCE NUMERALS

100: server 110: display portion
112: server controller 114: communication portion
120: map 130: project register
131: project basic information registration/editing unit
132: project area registration/editing unit
133: image registration unit 134: earthwork drawing registration unit
135: equipment information registration/editing unit 136: geo-fencing registration/editing unit
137: camera registration/editing unit 140: work plan creating portion
150: driving route creating portion 152: driving route creating/editing unit
154: driving route attribute information registration unit 160: work area creating portion
162: digging work creating/editing unit 164: trench work creating/editing unit
166: grading work creating/editing unit 170: work plan group creating portion
180: monitoring portion 190: equipment monitoring portion
191: equipment location monitoring unit 192: equipment status information monitoring unit
193: equipment work information monitoring unit 194: equipment image monitoring unit
195: equipment alarm monitoring unit 200: field monitoring portion
202: site earthwork condition monitoring unit 204: equipment collision risk monitoring unit
206: camera monitoring unit 210: work plan execution portion
211: start control unit 212: work plan transmission unit
213: work pause/restart unit 214: work plan delete unit
215: emergency stop unit 216: simulation unit
800: sensor module 810: sensor
812: equipment controller 814: communication portion
816: driving portion 850: network
870: construction machinery 900: camera

The invention claimed is:

1. A method of making work plans for construction machinery, the method comprising:
receiving, by a server, location information of the construction machinery detected through a CCTV or a drone from the construction machinery at a work site;
displaying information of main management areas of the work site on a display portion of the server;
displaying a starting point and an ending point of a driving route of the construction machinery using the location information of the construction machinery on the display portion of the server;
creating a driving route between the starting point and the ending point using the information of the main management areas;
transmitting the created driving route to the construction machinery by the server, and
controlling the construction machinery by the server based on the work plans to start remotely, pause/restart temporarily, and emergency stop in response to an error occurs in the construction machinery, wherein the work plans are established according to the created driving route.

2. The method of claim 1, wherein the driving route is created by being converted into waypoints when the starting point and the ending point of the driving route are designated.

3. The method of claim 2, wherein the driving route is created by being converted into the waypoints such that the driving route automatically passes through at least one middle point when the at least one middle point of the driving route is additionally designated.

4. The method of claim 1, wherein the main management areas include an obstacle including at least one of a puddle, a slope collapse area, a construction material and an unplanned vehicle or construction machinery at the work site that obstruct a running of the construction machinery.

5. The method of claim 1, wherein the driving route between the starting point and the ending point includes a middle point arbitrarily set by a driving route designer to avoid at least one of the main management areas.

6. The method of claim 1, wherein creating the driving route includes registering a movement condition of the construction machinery moving along the driving route.

7. The method of claim 1, wherein the work plan is checked on an equipment display device or an operator's mobile device.

8. The method of claim 1, further comprising:
monitoring whether the construction machinery works according to the work plan.

9. The method of claim 1, wherein the construction machinery includes automatic construction machinery.

10. A method of making work plans for construction machinery, the method comprising:
receiving, by a server location information of the construction machinery detected through a CCTV or a drone from the construction machinery at a work site;
setting a work area for the construction machinery to move and work;

setting an initial location point (Platform) and a work boundary at which the construction machinery arrives at the work area and starts initial work;

setting intermediate location point (Platform) paths at which the construction machinery moves after the initial work in the work area and continuously works;

transmitting the set intermediate location point paths to the construction machinery; and controlling the construction machinery by the server based on the work plans to start remotely, pause/restart temporarily, and emergency stop in response to an error occurs in the construction machinery, wherein the work plans are established according to the set work area.

11. The method of claim 10, wherein the work boundary is created by being converted into a maximum work area space in which the construction machinery can work in place or a preset work area space at each location point (Platform).

12. The method of claim 10, wherein setting the work area includes creating a work area space in which the construction machinery can work in place to fit the work site.

13. The method of claim 10, wherein setting the work area includes setting the work area by grouping at least one of the work area into a group.

14. The method of claim 10, wherein setting the work area includes, dividing one work performed by the construction machinery into a plurality of sub-works; and registering working areas and characteristics of the sub-works.

15. The method of claim 14, wherein the construction machinery includes an excavator, the one work includes an excavation work, and the sub-works include digging work having an excavation operation and a dump truck loading operation, trench work having a digging operation, and grading work having a leveling operation.

16. The method of claim 10, wherein the set intermediate location point paths is checked on an equipment display device or an operator's mobile device.

17. The method of claim 10, further comprising:

monitoring whether the construction machinery works according to the set intermediate location point paths.

18. The method of claim 10, wherein the construction machinery includes automatic construction machinery.

* * * * *